United States Patent
Almquist et al.

(10) Patent No.: US 6,632,896 B1
(45) Date of Patent: Oct. 14, 2003

(54) ETHYLENE POLYMERIZATION

(75) Inventors: Vidar Almquist, Stathelle (NO); Paul Allemeersch, Stathelle (NO); Roger Goris, Stathelle (NO); Ann Kristin Lindahl, Stathelle (NO)

(73) Assignee: Borealis Technology Oy (FI)

( * ) Notice: Subject to any disclaimer, the term of this patent is extended or adjusted under 35 U.S.C. 154(b) by 0 days.

(21) Appl. No.: 09/447,956

(22) Filed: Nov. 29, 1999

(51) Int. Cl.$^7$ .................................................. C08F 4/42
(52) U.S. Cl. .................... 526/96; 526/105; 526/106; 526/113; 526/114; 526/118; 526/119; 526/126; 526/131; 526/348.2; 526/348.6; 526/348.5
(58) Field of Search ................ 526/96, 106, 105, 526/113, 114, 118, 119, 126, 131, 348.2, 348.5, 348.6

(56) References Cited

U.S. PATENT DOCUMENTS

| | | | |
|---|---|---|---|
| 4,818,800 A | * 4/1989 | McDaniel et al. | 526/106 |
| 4,981,927 A | 1/1991 | Rekers et al. | |
| 5,198,400 A | * 3/1993 | Katzen et al. | 502/113 |
| 5,576,263 A | * 11/1996 | Badley et al. | 502/237 |

FOREIGN PATENT DOCUMENTS

| | | |
|---|---|---|
| EP | 0 591 968 B1 | 7/1997 |
| EP | 0 647 661 B1 | 3/1998 |
| EP | 0 882 741 A | 12/1998 |

\* cited by examiner

*Primary Examiner*—J. Brooks
*Assistant Examiner*—William Cheung
(74) *Attorney, Agent, or Firm*—Karen Lee Orzechowski; Liniak Berenato & White

(57) ABSTRACT

Ths invention provides a process for the preparation of a polyethylene, in particular an HDPE suitable for blow moulding of HIC, which comprises polymerizing ethylene and, optionally an ethylenically unsaturated comonomer copolymerizable therewith, in the presence of a catalyst comprising a first silica-supported chromium catalyst having a pore volume of at least 2 mL/g, a surface area of at least 350 m$^2$/g and a chromium content of 0.1 to 1.0% by weight and a second silica-supported chromium catalyst having a pore volume of at least 2 mL/g, a surface area of at least 450 m$^2$/g and a chromium content of 0.1 to 1.0% by weight, wherein the silica support of said first catalyst also comprises alumina and the silica support of said second catalyst also comprises titanium, and preferably a co-catalyst.

7 Claims, No Drawings

ETHYLENE POLYMERIZATION

This invention relates to polymer resins, their production and their use, in particular polyethylene resins suitable for blow moulding applications.

Household and industrial containers (HIC) have been produced for over 30 years by blow moulding of high density polyethylene (HDPE) resins produced using chromium (Cr) catalysts which are commercially available from catalyst producers such as Grace, Crosfield and PQ. The HDPE resins produced using Cr catalysts have excellent extrudability and thus allow high output for blow moulding machines. Indeed blow moulding machines are often specifically constructed for optimum performance using Cr catalyst produced HDPE (Cr-HDPE), for example in terms of screw configuration, and die and forming tool construction. As a result Cr-HDPE resins are essentially the industry standard for HIC blow moulding worldwide.

The most important properties for a good Cr-HDPE grade for HIC blow moulding are high environmental stress crack resistance (ESCR) and high stiffness in the moulded product, good extrudability of the molten resin (to permit high output by the blow moulding machine) and swelling and sagging properties of the molten resin which match the configuration of the blow moulding machine and result in uniform wall thickness in the moulded product.

Improvements in these properties for Cr-HDPE have resulted in HIC produced by blow moulding of Cr-HDPE becoming increasingly competitive relative to HIC (e.g. bottles or containers) produced by other techniques or using other materials.

For containers, e.g. household and industrial containers such as bottles, barrels, tubs, jars, vats, etc. and container closures, e.g. lids, caps etc., and in particular containers for liquids containing organic solvents or detergents, one especially important property is ESCR. This is measured by standard tests and is a measure of the ability of the container to remain viable in use, to be stacked, to be left exposed, etc.

However, while Cr-HDPE has become an industry standard for blow moulding of HIC, the ESCR values achievable using commercially available Cr catalysts is less than is desirable for various HIC and there remains a need for improved HDPEs for blow moulding of HIC. Furthermore, using commercially available Cr catalysts, in order to produce Cr-HDPE having appropriately high extrudability for blow moulding of HIC it has been necessary to operate polymerization reactors at temperatures which are so high as to be close to the level where reactor fouling occurs. Under these conditions, the HDPE production rate has been found to be lower than the production rates for other polymers using the same reactors. Thus there is also a need for Cr-HDPEs which can be produced more efficiently.

We have now surprisingly found that these problems may be addressed by the use of a blend of supported Cr catalysts for Cr-HDPE production, where a first Cr catalyst is supported on an alumina-silica carrier and a second Cr catalyst is supported on a titania-silica carrier or co-precipitated with titania-silica as a tergel.

Viewed from one aspect the invention thus provides a high density polyethylene, e.g. having a density of at least 0.957 g/mL, more preferably 0.958 to 0.965 g/mL, produced using a chromium-catalysed polymerization, wherein the catalyst comprises a first silica-supported chromium catalyst having a pore volume of at least 2 mL/g, a surface area of at least 350 m$^2$/g (preferably at least 400 m$^2$/g, more preferably at least 450 m$^2$/g) and a chromium content of 0.1 to 1.0% by weight and a second silica-supported chromium catalyst having a pore volume of at least 2 mL/g, a surface area of at least 450 m$^2$/g (preferably at least 500 m$^2$/g, especially up to 600 m$^2$/g) and a chromium content of 0.1 to 1.0% by weight, wherein the silica support of said first catalyst also comprises alumina and the support of said second catalyst also comprises titania.

Thus the second catalyst may for example be a co-gel (i.e. Cr on TiO$_2$/SiO$_2$) or a tergel (i.e. Cr/TiO$_2$/SiO$_2$).

The chromium component of the catalysts may, as in conventional catalysts, be a chromium oxide (e.g. Cr$_2$O$_3$, CrO$_3$ or CrO) or a precursor compound convertible in use to a chromium oxide. In general Cr$_3$O$_3$ is preferred as this can be transformed by calcination to CrO$_3$. In the reactor, the chromium is transformed to the active form CrO.

Viewed from an alternative aspect the invention comprises a high density polyethylene containing catalyst residues of titanium, chromium, aluminium, silicon and optionally also boron, having an MFR$_2$ of at least 0.2 g/10 min, an MFR$_{21}$ of at least 20 g/10 min and a bottle ESCR F$_{50}$ of at least 280 hours.

Viewed from a further aspect, the invention provides a process for the preparation of a polyethylene, in particular an HDPE suitable for blow moulding of RIC, which comprises polymerizing ethylene and, optionally an ethylenically unsaturated comonomer copolymerizable therewith, in the presence of a catalyst comprising a first silica-supported chromium catalyst having a pore volume of at least 2 mL/g, a surface area of at least 350 m$^2$/g (preferably at least 400 m$^2$/g, more prferably at least 450 m$^2$/g) and a chromium content of 0.1 to 1.0% by weight and a second silica-supported chromium catalyst having a pore volume of at least 2 mL/g, a surface area of at least 450 m$^2$/g (preferably at least 500 m$^2$/g, especially up to 600 m$^2$/g) and a chromium content of 0.1 to 1.0% by weight, wherein the silica support of said first catalyst also comprises alumina and the silica support of said second catalyst also comprises titania, and preferably a co-catalyst, e.g. a trialkylboron.

Viewed from a still further aspect the invention provides a catalyst system for ethylene polymerization, said system comprising a first silica-supported chromium catalyst having a pore volume of at least 2 mL/g, a surface area of at least 350 m$^2$/g (preferably at least 400 m$^2$/g, more prferably at least 450 m$^2$/g) and a chromium content of 0.1 to 1.0% by weight and a second silica-supported chromium catalyst having a pore volume of at least 2 mL/g, a surface area of at least 450 m$^2$/g (preferably at least 500 m$^2$/g, especially up to 600 m$^2$/g) and a chromium content of 0.1 to 1.0% by weight, wherein the silica support of said first catalyst also comprises alumina and the silica support of said second catalyst also comprises titania, and preferably a co-catalyst, e.g. a trialkylboron. The components of such a system may be mixed in the polymerization reactor or before insertion into the polymerization reactor.

In the catalyst systems of the invention, the silica supports preferably have substantially the same pore volumes, e.g. the titania-silica pore volume is from 70 to 130% of the alumina-silica pore volume, more preferably 80 to 120%, especially 90 to 110%.

Viewed from a yet still further aspect the invention also provides the use of a high density polyethylene according to the invention for blow moulding, particularly of HIC, especially bottles, in particular having an internal volume of 0.1 to 25L.

Viewed from another aspect the invention provides a blow moulded polyethylene container formed from a high density polyethylene according to the invention.

Viewed from a still further aspect the invention provides a high density polyethylene container (e.g. a bottle) having a bottle ESCR $F_{50}$ value of at least 280 hours, preferably at least 300 hours, e.g. 300 to 340 hours.

In the alumina:silica and titania:silica supports in the chromium catalysts, the silica content is preferably 80 to 99 wt %.

The pore volume in the catalyst supports is preferably 2 to 3 mL/g, especially 2.1 to 2.9 mL/g. The surface area is preferably 450 to 600 m$^3$/g. Such supported chromium catalysts are generally referred to as high pore volume catalysts.

For use in gas phase polymerization, the chromium content of the catalysts may be at the low end of the specified ranges, e.g. 0.1 to 0.2% wt. For slurry polymerization, higher chromium contents, e.g. 0.5 to 10% wt will generally be preferred.

Chromium catalysts of the type required are available commercially, for example EP241A (available from Crosfield) and C-2430 (available from PQ) which have an alumina:silica support and EP350HiTi (available from Crosfield), Magnapore 963 (available from Grace) and C-25305 (available from PQ) which have titania: silica supports. Alternatively, the catalysts may be prepared analogously to those of EP-B-291824 and EP-B-647661.

The first and second chromium catalysts desirably have similar chromium contents, pore volumes and surface areas.

The first and second chromium catalysts are desirably used in a relative weight ratio of 95:5 to 5:95, preferably 90;10 to 50:50, more preferably 85:15 to 60:40.

As is conventional for such supported catalysts, the chromium catalysts are desirably activated by calcination, e.g. by heating to 250 to 950° C., more preferably 600 to 800° C. for a period of 30 minutes to 24 hours, preferably 2 to 12 hours in a dry non-reducing gas, e.g. oxygen or dry air or nitrogen.

The catalysts are desirably used together with a cocatalyst. Any of the cocatalysts conventionally used with chromium catalysts may be used, e.g. metallic and/or non-metallic reducing agents as described in EP-B-291824, in particular boron cocatalysts such as trialkylborons, for example triethyl boron. Such cocatalysts may be used in conventional quantities relative to the chromium catalysts, e.g. in a molar ratio relative to the chromium in the chromium catalysts of 0.01:1 to 2:1.

Combinations of supported chromium catalysts have been described before, e.g. in EP-B-291824 which describes the use combination of a: high pore volume Cr/alumina:silica catalyst and a low pore volume Cr/silica catalyst for HDPE production, EP-B-591968 which describes the combination of a low pore volume Cr/titania:ailica catalyst and a relatively high pore volume Cr/silica catalyst, EP-B-647661 which describes the use of a combination of a high pore volume Cr/titania:silica catalyst and a low pore volume Cr/titania:silica catalyst for the production of polyethylene films, and WO92/17511 which describes the use of a low pore volume and a high pore volume Cr/silica catalyst (where one of the catalysts also contains one of Al, Ti, Zr, B and P) for the production of HDPE for blow moulding of bottles. None of these suggests the combination of high pore volume Cr/alumina; silica and high pore volume Cr/titania:alumina.

The polymerization process of the invention will typically involve the use of an ethylenically unsaturated comonomer, e.g. containing 3 to 16 carbons, more especially 3 to 10 carbons, for example an α-olefin or a diene, in particular hex-1-ene, but-1-ene, pent-1-ene, 3-methyl-but-1-ene, 4-methyl-pent-1-ene, oct-1-ene and dec-1-ene, but especially hex-1-ene or but-1-ene. One surprising benefit of the catalyst system of the invention is that the Cr/titania:silica catalyst serves to generate comonomer from the ethylene feed. Accordingly smaller than conventional quantities of comonomer are generally needed. Typically the comonomer may be used as 1–13 mole/kmole relative to the ethylene. This use of Cr/titania:silica is novel and forms a further aspect of the invention. Viewed from this aspect the invention provides a process for ethylene polymerization in which ethylene is copolymerized with a $C_{3-10}$ α-olefin comonomer in the presence of a first ethylene polymerization catalyst, characterised in that a further catalyst which is a titania:silica supported chromium catalyst, preferably together with a trialkylboron cocatalyst, is used to reduce the quantity of comonomer used. Alternatively viewed the invention provides the use of a titania: silica supported chromium catalyst in particular one having a pore volume of at least 2.0 mL/g in a catalyst system (in particular one containing chromium on a non-titanium containing support), and especially preferably together with a trialkylboron (e.g. triethylboron) cocatalyst, for ethylene/ $C_{3-10}$ α-olefin comonomer copolymerization to reduce the amount of comonomer required in said copolymerization, especially to reduce the amount of hex-1-ene required. The use of a trialkylboron cocatalyst, in particular triethylboron, is especially preferred as this appears to increase ESCR still further. The trialkylboron enhances the catalyst activity, contributes to formation of more low molecular weight polymer (so broadening the molecular weight distribution) and moreover, with the catalyst, appears to generate comonomer which is used in the polymerization process.

The HDPE polymerization according to the invention may be effected in a conventional polymerization reactor or a series of two or more such reactors. Examples of suitable reactors include gas phase, liquid phase and slurry phase reactors. Slurry phase polymerization is generally preferred. Polymerization may be effected at conventional temperatures and pressures and using conventional quantities of the chromium catalyst, cocatalyst, ethylene, comonomer, solvent, diluent and hydrogen. Examples of such polymerization parameters may be found in the patent publications cited above, the contents of which are hereby incorporated by reference. Preferred polymerization temperatures are in the range 85 to 110° C. and preferred polymerization pressures are in the range 30 to 50 bars.

The polymerization reaction is preferably one which produces a particulate HDPE of a size appropriate for blow moulding operations, e.g. in the range 0.1 to 2 mm. However if necessary, the HDPE product may be extruded or ground to produce a particulate of the desired size.

The HDPE blow moulding powder will generally include further additives, e.g. as is conventional in the field. Typical such additives include antioxidants, colouring agents, light (e.g. Uv light) stabilizers, lubricants, etc. Generally such additives will make up no more than about 0.2% wt of the moulding powder.

The HDPE blow moulding powder may be blow moulded using conventional blow moulding machines, e.g. operating at melt pressures in the range 200–350 bars and temperatures of 170 to 230° C. While wall thicknesses for the blow moulded products will depend upon the size of the product and its intended use, they will generally be in the range 0.5 to 3 mm. Typical HIC products that may be produced in this way include 0.1 to 25L bottles, e.g. for chemicals, solvents, detergents and paints.

If desired, the HDPE of the present invention may be used in other forming techniques or for the formation of products other than HIC, e.g. pipes and sheets, particularly thermoformed sheets.

The invention will now be described further with reference to the following non-limiting Examples.

Bottle ESCR $F_{50}$ is measured as follows:

Containers to be tested are conditioned before testing at 23° C. and 50% relative humidity for at least 72 hours. At least 10 containers are tested to provide an ESCR value and containers of a reference material blown the same day as the test material are also tested.

The containers are filled to 5% of overflow capacity with a 10% by volume solution of polyoxyethylated nonylphenol (available under the trade names Antarox CO-630 and Igepal CO-630) in distilled water. The solution is used within 24 hours of being made up. A cap is placed on each container and a weight of between ⅓ and ¼ of the maximum top load is placed on top. The containers are placed in an oven at 50° C. and are checked for failure daily. The percentage of total failures is plotted against log time (in hours), a best fit line is drawn and the time in hours corresponding to 50% failures ($F_{50}$) is determined from the best fit line.

EXAMPLE 1

A series of ethylene polymerization reactions were run on a bench scale reactor using a Cr/alumina:silica catalyst (EP241A, available from Crosfield), either alone or in combination with one or two Cr/titania: silica catalysts (EP350HiTi available from Crosfield or Magnapore 963 available from Grace). These are referred to in Table below as catalysts A (EP241A), B (EP350HiTi) and C (Magnapore 963).

10 g batches of the catalyst or catalyst mixture were activated by heating in dry air for 6 to 12 hours at the temperatures specified in Table 1 below. Activation was carried out in a quartz tube with a sinter. The tube containing the catalyst was placed in an oven and heated air was passed through the tube. The heated air passing through the sinter creates a fluidized bed of the catalyst. After activation the catalyst was cooled by passing nitrogen through the sinter.

The polymerization reaction was effected in a 2L stirred bench scale reactor using the catalyst amounts and types specified in Table 1 below. The catalyst was fed into the empty reactor, 1L isobutane with 0.16% wt (relative to the isobutane) of hex-1-ene was added and the stirrer was activated. A pressure of 38 bars was established by adding ethylene at the reaction temperature specified in Table 1. The pressure was kept constant by adding ethylene as the polymerization progressed. The runs were stopped when from 3000 to 4500 g polymer/g catalyst had been formed. The polymer powder was taken out of the reactor and blended with calcium stearate and Irganox B561 to give a 1500 ppm (by weight) content of Irganox B561 and a 400 ppm (by weight) content of calcium stearate. The blend was then pelletized in an extruder. For runs 6 to 10, triethylboron was used as a co-catalyst in a concentration of 0.2 mmol in the isobutane.

The polymerization conditions used obviously do not equate to those used in a full commercial reactor, however the results in Table 1 below demonstrate that under comparable reaction conditions increased MFR is achieved using the catalyst blends, even when the blends were activated at lower temperatures.

TABLE 1

|  | Run No. | | | | | | | | | |
| --- | --- | --- | --- | --- | --- | --- | --- | --- | --- | --- |
|  | 1‡ | 2 | 3 | 4 | 5 | 6‡ | 7 | 8 | 9 | 10 |
| Catalyst | A | 0.8A* 0.2B | 0.8A 0.2B | 0.65A 0.35B | 0.65A 0.35C | A | 0.8A 0.2B | 0.8A 0.2B | 0.65A 0.35B | 0.65A 0.35B |
| Activation Temperature (° C.) | 660 | 620 | 660 | 620 | 660 | 660 | 620 | 660 | 620 | 660 |
| Catalyst weight (g) | 0.093 | 0.081 | 0.11 | 0.117 | 0.103 | 0.090 | 0.081 | 0.083 | 0.093 | 0.081 |
| Reaction Temperature (° C.) | 104.5 | 104.5 | 104.5 | 104.5 | 104.5 | 102.5 | 102.5 | 102.5 | 102.5 | 102.5 |
| Reaction pressure (bars) | 33 | 38 | 38 | 38 | 38 | 38.6 | 38.6 | 38.6 | 38.6 | 38.6 |
| Polymer weight (g) | 360 | 356 | 359 | 398 | 413 | 310 | 338 | 311 | 404 | 279 |
| $MFR_2$ (g/10 min) | 0.3 | 0.31 | 0.29 | 0.44 | 0.45 | 0.34 | 0.23 | 0.34 | 0.44 | 0.49 |
| $MFR_{21}$ (g/10 min) | 16 | 16 | 18 | 23 | 25 | 15 | 16 | 25 | 30 | 33 |
| Density (g/mL) | 951 | 952 | 953 | 953 | 954 | 953 | 953 | 954 | 954 | 954 |

*i.e. 80% wt A, 20% wt B
‡Reference example

These test runs demonstrated that the MFR problem (i.e. the problem of achieving sufficiently high MFR to allow good extrudability in blow moulding of the HDPE to produce HIC while operating the commercial scale polymerization reactor at temperatures safely below the levels at which fouling occurs) is addressed by the use of the high pore volume Cr/alumina:silica and Cr/titania:silica blends.

EXAMPLE 2

A blend of 76.7% wt of EP241A and 23.3% wt of EP350HiTi was activated by heating in dry air at 640° C. for about 10 hours using a full scale calcination oven and a fluidized bed technique and nitrogen cooling as described in Example 1. As a reference, the chromium/alumina:silica catalyst EP241A was similarly activated at 660° C.

The blend and the reference catalyst were used to polymerize ethylene in isobutane in a loop reactor at 103° C. The ethylene content was a mol % in the isobutane. Hydrogen was used at 150 mole $H_2$/kmole ethylene and the comonomer hex-1-ene was used at 9 mole/kmole ethylene. 3.8 ppm (by weight) triethylboron was included in the isobutane feed.

Using the catalyst blend, the MFR target of $MFR_2$=0.21 g/10 min and $MFR_{21}$, 25 g/10 min was achieved at a temperature of 103° C. By way of comparison, using EP241A alone, such a target would have required a reaction temperature of 106.5° C., a temperature which is not feasible as it is above the fouling limit for the reactor.

The properties of the HDPE resins produced are set out in Table 2 below.

TABLE 2

| | Run | | |
|---|---|---|---|
| | 15 | 16 | 17 |
| Catalyst | Reference | Blend | Blend |
| Mw (kD) | 225 | 225 | 220 |
| Mn (kD) | 13 | 12 | 12 |
| MWD | 17 | 19 | 19 |
| $MFR_{21}$ (g/10 min) | 0.18 | 0.21 | 0.21 |
| $MFR_{21}$ (g/10 min) | 20 | 25 | 25 |
| Density (g/mL) | 0.957 | 0.958 | 0.957 |

EXAMPLE 3

Blow Moulding

Samples of the HDPE resins of Runs 15 to 17 of Example 2 and a commercial HDPE (Fina 5502 from Fina) were blow moulded to form containers. The weight swell for the blow moulding operation and the bell and bottle ESCR values for the containers were determined and are set out in Table 3 below.

TABLE 3

| | HDPE | | | |
|---|---|---|---|---|
| | Fina 5502 | Run 15 | Run 16 | Run 17 |
| Weight Swell (%) | 100 | 99 | 101 | 100 |
| Bell ESCR (hours)[1] | — | 52 | 46 | 54 |
| Bottle ESCR $F_{50}$ (hours)[2] | — | 220 | 300 | 328 |

[1] Bell ESCR determined according to ASTM D:1693-97
[2] Bottle ESCR $F_{50}$ determined as described above The processability of the HDPE produced using the Cr/alumina:silica and Cr/titania:silica catalyst blend (Runs 16 and 17) was improved relative to the commercial HDPE and the HDPE produced using the reference catalyst (Run 15) and the bottle ESCR, a parameter crucial to the suitability of the HDPE for blow moulding of HIC, was dramatically improved.

What is claimed is:

1. A process for the preparation of a polyethylene which comprises polymerizing ethylene and, optionally, an ethylenically unsaturated comonomer copolymerizable therewith, in the presence of a catalyst comprising a first silica-supported chromium catalyst having a pore volume of at least 2 mL/g, a surface area of at least 350 m²/g and a chromium content of 0.1 to 1.0% by weight and a second silica-supported chromium catalyst having a pore volume of at least 2 mL/g, a surface area of at least 450 m²/g and a chromium content of 0.1 to 1.0% by weight, wherein the silica support of said first catalyst also comprises alumina and the silica support of said second catalyst also comprises titania, wherein no co-catalyst is used.

2. A process for the preparation of a polyethylene which comprises polymerizing ethylene and, optionally, an ethylenically unsaturated comonomer copolymerizable therewith, in the presence of a catalyst comprising a first silica-supported chromium catalyst having a pore volume of at least 2 mL/g, a surface area of at least 350 m²/g and a chromium content of 0.1 to 1.0% by weight and a second silica-supported chromium catalyst having a pore volume of at least 2 mL/g, a surface area of at least 450 m²/g and a chromium content of 0.1 to 1.0% by weight, wherein the silica support of said first catalyst also comprises alumina and the silica support of said second catalyst also comprises titania wherein a trialkylboron co-catalyst is also used.

3. A process as claimed in claim 1 for the copolymerization of ethylene and an α-olefin.

4. A process for ethylene polymerization in which ethylene is copolymerized with a $C_{3-10}$ α-olefin comonomer in the presence of a first ethylene polymerization catalyst wherein a second catalyst which is a titania:silica supported chromium catalyst is used to reduce the quantity of comonomer used and wherein no co-catalysts are used.

5. A process for ethylene polymerization in which ethylene is copolymerized with a $C_{3-10}$ α-olefin comonomer in the presence of a first ethylene polymerization catalyst wherein a second catalyst which is a titania:silica supported chromium catalyst is used to reduce the quantity of comonomer used and wherein said first and second catalysts are used together with a trialkylboron co-catalyst.

6. A process as claimed in claim 2 for the copolymerization of ethylene and an α-olefin.

7. A process for the preparation of a high density polyethylene containing catalyst residues of titanium, chromium, aluminum, silicon and optionally also boron, having a $MFR_2$ of at least 0.2 g/10 min, an $MFR_{21}$ of at least 20 g/10 min and a bottle ESCR $f_{50}$ of at least 280 hours, said process comprising polymerizing ethylene and, optionally, an ethylenically unsaturated comonomer copolymerizable therewith, in the presence of a catalyst comprising an alumina:silica supported chromium catalyst and a titanium:silica supported chromium catalyst having a pore volume of at least 2 mL/g, a surface area of at least 350 ma first silica ethylene polymerization in which ethylene is copolymerized with a $C_{3-10}$ α-olefin comonomer in the presence of a first ethylene polymerization catalyst wherein a second catalyst which is a titania:silica supported chromium catalyst is used to reduce the quantity of comonomer used.

* * * * *